April 14, 1936.  F. FISHER  2,037,320

HOOK

Filed April 14, 1934

Inventor
F. Fisher
By Arthur H. Sturges
Attorney

Patented Apr. 14, 1936

2,037,320

UNITED STATES PATENT OFFICE 2,037,320

HOOK

Fred Fisher, St. Edward, Nebr.

Application April 14, 1934, Serial No. 720,616

1 Claim. (Cl. 248—306)

This invention relates to an improvement in hooks, and more particularly to removable impaling hooks for use princiually in packing houses or meat storage plants or butcher shops where heavy sidepieces or quarters of meat are handled for temporary storage.

The invention has for its principal object to provide a meat hanger which will be convenient in use so that an operator, without assistance, may readily attach the meat to the hook or detach it therefrom, gravity being depended upon, in part, for maintaining the load in elevated position, and hook-releasing means being provided for the hook which operates automatically so that the hook will swing downwardly to permit removal of the load.

The invention includes a movable carrier in combination with the removable impaling hook.

While the invention is shown and described as a meat holder and carrier, it may of course be used for other purposes.

The invention consists of the new and useful construction, combination and arrangement of parts as described herein and claimed, and as illustrated in the accompanying drawing, it being understood that changes may be made in form, size, proportions and minor details of construction, said changes being within the scope of the invention as claimed.

In the drawing, which shows one embodiment of the invention, Figure 1 is a view in side elevation of the detachable impaling hook and its carrier, a weighted object engaged by the hook being in section.

Figure 1:
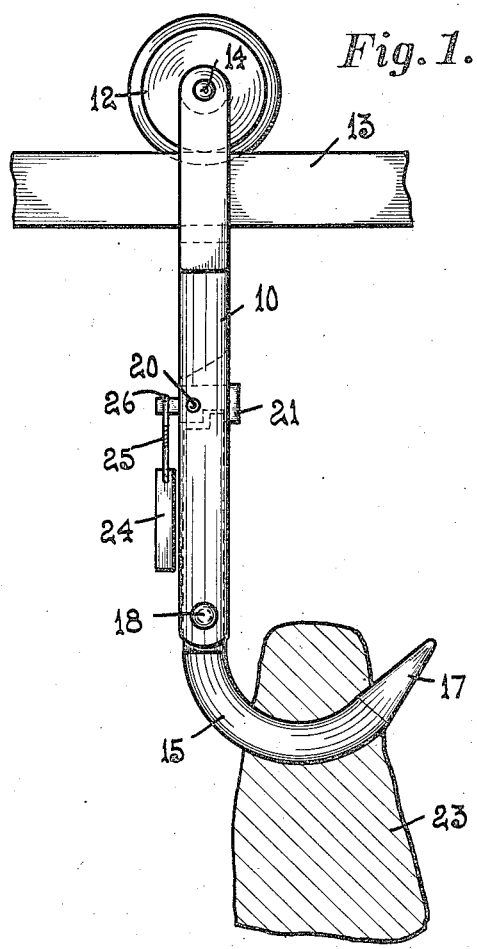

Referring now to the drawing for a more particular description, numeral 10 indicates a normally upright carrier-bar, its lower part being provided with a recess or channel 11 opening on its sides and lower end, its upper end being provided with a flanged wheel 12 adapted to move on a horizontal track 13, the axial mounting for the wheel being indicated at 14.

The hook 15 is provided with a flat rectilinear arm-portion 16 operating as a latch, and has a tapered end-portion 17 operating as an impaling-member.

Figure 2:
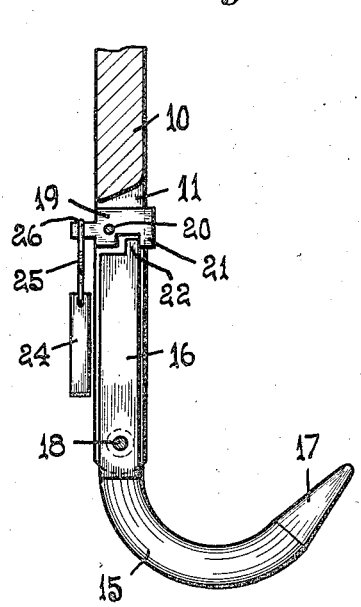
Figure 2 is a side view of the hook, partly broken away, to clearly show a weighted locking-plate.
Figure 3:
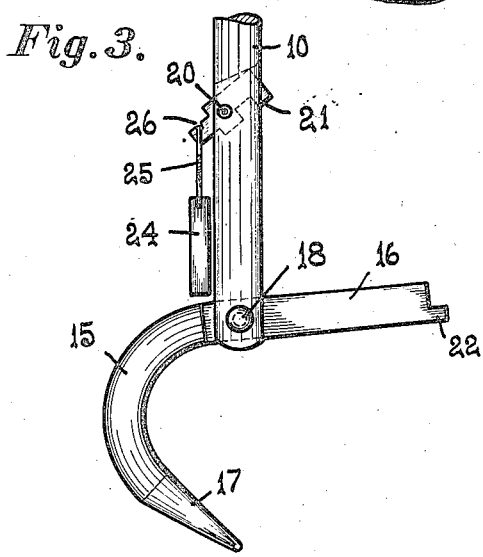
Figure 3 is a side view of parts, showing the position of parts when the hook swings rearwardly for detaching the load.
Figure 4:
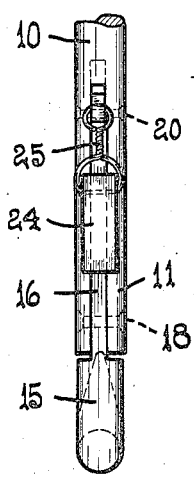
Figure 4 is a rear view of the parts shown in Figure 2.

The flat arm of the hook is disposed in the channel 11 of the supporting-bar 10, and is pivotally mounted as indicated at 18, this pivot 18 traversing the lower part of the carrier-bar and the flat arm 16 of the hook, and as described, the hook may have swinging movements relative to the carrier-bar 10 to the position shown in Figure 2 or to the position shown in Figure 3.

Numeral 19 indicates a locking-plate or latch which is disposed in the upper part of the channel 11, said plate being pivotally mounted midway between its ends as indicated at 20, said plate being provided at its front end with a downwardly projecting lip 21. The flat arm 16 of the hook is provided with a tooth or projection 22, and it will be understood that the plate 19 may have a swinging movement to cause its projection 21 to engage the projection 22 of the arm 16 to prevent a swinging movement of the hook, the locking-plate and arm 16 at that time being disposed as shown in Figures 1 and 2 of the drawing.

It will be noted that the proportions of the locking plate relative to its pivot 20 are such that a part of greater weight is disposed at its front end, and therefore said plate will normally remain in locked position relative to the projection 22 when said arm 16 is disposed parallel with the bar 10.

In the practice of the invention, while the arm 16 is secured in a stationary position in the channel 11 engaged by the locking-plate, as last mentioned, an operator mounts the load 23, simply by moving it with a downward thrust and impaling it upon the hook, in a well known manner; and it is obvious that the weight of the load 23 on the hook will cause the projection 22 to be pressed firmly and forwardly against the projection 21 of the locking plate, and these parts may remain in the positions mentioned, for any required length of time, the projection 22 being pressed outwardly by the weight of the load 23.

Numeral 24 indicates a weight provided with a loop 25. This loop is adapted to engage in a notch 26 which is formed in that end of the locking-plate opposite to its projection 21, and after the load 23 has been placed on the hook the weight 24 is disposed with its loop 25 engaging in the notch 26 of the locking-plate.

When the load 23 is detached from the hook 15 the parts will be disposed as shown in Figure 3 of the drawing. For detaching the load the operator, when grasping said load, lifts it lightly, which reduces the degree of pressure of the projection 22 against the projection 21 of the locking-plate, and by action of gravity the weight 24 will cause the locking-plate to swing to its position shown in Figure 3 of the drawing.

It will be observed that by having a portion of the locking plate or latch 19 extended an appreciable distance to the rear or back of the shank 16, and with the weight 24 secured thereto, that the latch 19 is quite free to automatically function when the full load or weight 23 on the hook 15 is partially relieved. Furthermore the location of the hook releasing device 24 and 25 to the rearward of the shank as distinct from within the supporting bar 10 gives ready accessibility for manually manipulating the latch when desired. This facility or accessibility would not be obtained if these parts of the construction were located within the supporting bar 10 of the hook.

It will thus be seen that the hook will be held in a convenient position for impaling the load on the hook, and that the hook will be disposed in such a position that the load may be conveniently detached from the hook.

After the load 23 has been removed from the hook, said hook may be swung to operative position and the weight 24 then may be removed from the locking plate.

From the foregoing description it is thought to be obvious that a hook constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish it to be understood as limiting myself to the precise arrangement and formation of the several parts herein shown in carrying out my invention in practice except as claimed.

I claim as my invention:—

A suspension hook comprising a supporting bar, a hook member having a shank pivoted in the lower end of the bar and disposed normally coaxial within the bar, a latch pivotally mounted on the bar and having a notch therein receiving the free end of the shank to hold the same in normal position and with the hook member in position to receive a load, said latch having a portion projecting beyond the bar in a direction opposite the hook member, and a weight connected to said projecting portion of the latch and biasing the same to a releasing position, the load weight on the hook member being adapted to bind the latch on the shank and said latch releasing the shank when the weight of the load on the hook is partially released.

FRED FISHER.